(12) United States Patent
Ozawa et al.

(10) Patent No.: US 11,072,187 B2
(45) Date of Patent: Jul. 27, 2021

(54) INKJET RECORDING APPARATUS

(71) Applicant: KYOCERA Document Solutions Inc., Osaka (JP)

(72) Inventors: Noriaki Ozawa, Osaka (JP); Hiroatsu Tamai, Osaka (JP); Takeshi Watanabe, Osaka (JP); Yasuhiro Michishita, Osaka (JP); Hiroyuki Ueda, Osaka (JP); Toyotsune Inoue, Osaka (JP); Yusuke Takano, Osaka (JP); Naoto Miyakoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 73 days.

(21) Appl. No.: 16/589,749

(22) Filed: Oct. 1, 2019

(65) Prior Publication Data

US 2020/0108631 A1 Apr. 9, 2020

(30) Foreign Application Priority Data

Oct. 5, 2018 (JP) .............................. JP2018-190021

(51) Int. Cl.
*B41J 2/21* (2006.01)
*C09D 11/40* (2014.01)
*C09D 11/322* (2014.01)

(52) U.S. Cl.
CPC ........... *B41J 2/2114* (2013.01); *C09D 11/322* (2013.01); *C09D 11/40* (2013.01)

(58) Field of Classification Search
CPC ..... C09D 11/322; C09D 11/106; C09D 11/30; C09D 11/38; B41J 2/155

USPC .................... 347/6, 95, 100; 106/31.13, 31.6
See application file for complete search history.

(56) References Cited

U.S. PATENT DOCUMENTS

| | | | | |
|---|---|---|---|---|
| 8,777,393 | B2* | 7/2014 | Okada | C09D 11/30 347/100 |
| 8,919,948 | B2* | 12/2014 | Ozawa | B41J 2/01 347/100 |
| 9,309,423 | B2* | 4/2016 | Yano | C09D 11/38 |
| 2011/0234725 | A1 | 9/2011 | Wachi | |
| 2011/0236649 | A1* | 9/2011 | Nishiki | C09D 11/38 428/195.1 |

FOREIGN PATENT DOCUMENTS

JP 2007136879 A 6/2007
JP 2011201037 A 10/2011

* cited by examiner

*Primary Examiner* — An H Do
(74) *Attorney, Agent, or Firm* — Studebaker & Brackett PC (57) ABSTRACT

An inkjet recording apparatus includes three or more recording heads. The recording heads contain different inks and eject the different inks sequentially on a recording medium. The different inks each contain a pigment and a polyhydric alcohol monobutyl ether. Of the different inks, an ink to be ejected first has the lowest pigment content ratio. Of the different inks, an ink to be ejected third and an ink to be subsequently ejected each have a pigment content ratio equal to or higher than that of a corresponding one of inks to be precedently ejected. Of the different inks, an ink to be ejected second and an ink to be subsequently ejected each have a polyhydric alcohol monobutyl ether content ratio higher than that of a corresponding one of inks to be precedently ejected.

10 Claims, 4 Drawing Sheets

FIG. 5 ately significant when plural inks are used in combination for secondary or tertiary color drawing.

INKJET RECORDING APPARATUS

INCORPORATION BY REFERENCE

The present application claims priority under 35 U.S.C. § 112 to Japanese Patent Application No. 2018-190021, filed on Oct. 5, 2018. The contents of this application are incorporated herein by reference in their entirety.

BACKGROUND

The present disclosure relates to an inkjet recording apparatus. Rapid progress on inkjet recording apparatuses has been made in recent years to achieve image quality having high definition comparable with silver halide photographs in a case using photographic paper. Examples of printing processes adoptable to an inkjet recording apparatus include a recording process using a line type recording head and a recording process using a serial type recording head. The recording process using a line type recording head is a process in which a long recording head passes over a recording medium only one time. The recording process using a serial type recording head is a process in which a recording head reciprocates over a recording sheet plural times. An inkjet recording apparatus that adopts the recording process using a line type recording head among the printing processes is high in printing speed.

However, the inkjet recording apparatus adopting the recording process using a line type recording head does not perform overlaying printing unlike an inkjet recording apparatus adopting the recording process using a serial type recording head. Accordingly, image offset (a phenomenon in which an image adheres to a member of the inkjet recording apparatus) tends to occur in high-speed printing by the inkjet recording apparatus adopting the recording process using a line type recording head. Image offset by the inkjet recording apparatus adopting the recording process using a line type recording head is particularly significant when plural inks are used in combination for secondary or tertiary color drawing.

As a method for favorable image formation with plural inks using an inkjet recording apparatus adopting the recording process using a line type recording head, methods have been proposed in which viscosity of each ink is changed according to order of ejection. Specifically, examples of the propose methods include: a method in which the viscosity of an ink to be ejected later in order of ejection is set lower by increasing ejection temperature; and a method in which an ink to be ejected later in order of ejection is set to have higher viscosity.

SUMMARY

An inkjet recording apparatus according to an aspect of the present disclosure includes three or more recording heads. The recording heads contain different inks and eject the different inks sequentially on a recording medium. The different inks each contain a pigment and a polyhydric alcohol monobutyl ether. Of the different inks, an ink to be ejected first has the lowest pigment content ratio. Of the different inks, an ink to be ejected third and an ink to be subsequently ejected each have a pigment content ratio equal to or higher than that of a corresponding one of inks to be precedently ejected. Of the different inks, an ink to be ejected second and an ink to be subsequently ejected each have a polyhydric alcohol monobutyl ether content ratio higher than that of a corresponding one of inks to be precedently ejected.

DETAILED DESCRIPTION

The following describes embodiments of the present disclosure. In the following description, measurement values for volume median diameter ($D_{50}$) are values measured using a dynamic light scattering type particle size distribution analyzer ("ZERASIZER NANO ZS", product of Sysmex Corporation), unless otherwise stated. Measurement values for acid value are values measured in accordance with "Japanese Industrial Standard (JIS) K0070-1992", unless otherwise stated. Measurement values for mass average molecular weight (Mw) are values measured by gel permeation chromatography, unless otherwise stated. Note that in the present description, the term "(meth)acryl" is used as a generic term for both acryl and methacryl.

First Embodiment: Inkjet Recording Apparatus

A first embodiment of the present disclosure relates to an inkjet recording apparatus. The inkjet recording apparatus according to the present embodiment includes three or more recording heads. The recording heads contain different inks and eject the different inks sequentially on a recording medium. The inks each contain a pigment and a polyhydric alcohol monobutyl ether. Of the different inks, an ink to be ejected first has the lowest pigment content ratio. Of the different inks, an ink to be ejected third and an ink to be subsequently ejected each have a pigment content ratio equal to or higher than that of a corresponding one of inks to be precedently ejected. Of the different inks, an ink to be ejected second and an ink to be subsequently ejected each have a polyhydric alcohol monobutyl ether content ratio higher than that of a corresponding one of inks to be precedently ejected.

Examples of recording mediums that can be used in the inkjet recording apparatus according to the present embodiment include recording mediums made from paper, resin, metal, glass, or ceramics. Either a permeable recording medium or a non-permeable recording medium may be used, but a permeable recording medium is preferable. Specific examples of the recording medium include plain paper and coated paper made to be moisture absorbable. Another example of recording mediums is a recording medium processed with fiber (for example, cloth). That is, the inkjet recording apparatus according to the present embodiment can be used for inkjet textile printing.

In the following description, a recording head of all the recording heads of the inkjet recording apparatus that ejects an ink the n-th may be referred to as an n-th recording head (n is an integer of at least 1). Also, an ink of all the inks that is to be ejected the n-th by the n-the recording head of the inkjet recording apparatus may be referred to as an n-th ink (n is an integer of at least 1). For example, a recording head of all the recording heads that ejects an ink first is referred to as a first recording head. Also, an ink of all the inks that is to be ejected first by the first recording head is referred to as a first ink. A recording head of all the recording heads that ejects an ink the last is also referred to as a last recording head. An ink of all the inks that is to be ejected the last by the last recording head may be also referred to as a last ink.

The inkjet recording apparatus according to the present embodiment has the above configuration and can therefore prevent offset of a formed image. Presumably, the reason therefor is as follows.

In sequential ejection of a plurality of inks to a recording medium, an ink ejected relatively later tends to penetrate less into the recording medium than an ink ejected relatively earlier. This is because a portion of a pigment contained in an ink ejected onto the recording medium tends to remain on the surface of the recording medium without penetrating thereinto to inhibit penetration of an ink ejected thereafter into the recording medium. The above phenomenon (phenomenon in which penetrability of a later-ejected ink into a recording medium is impaired due to the presence of an earlier-ejected ink) readily occur with an increase in pigment content ratio in the earlier-ejected ink. In particular, the above phenomenon significantly readily occurs when the first ink to be ejected to a recording medium first has a high pigment content ratio. By contrast, in the inkjet recording apparatus according to the present embodiment, an ink having a higher pigment content ratio is to be ejected later and an ink of all the inks that has the lowest pigment content ratio is to be ejected first. In the above configuration, the inkjet recording apparatus according to the present embodiment can significantly prevent the above phenomenon.

In a case where the recording medium is made from a porous material (for example, printing paper), penetrability of an ink into the recording medium is expressed by the following Lucas-Washburn equation. In the following equation, L represents a penetration distance [m], r represents a capillary radius [m], γ represents a surface tension [mN/m], η represents a viscosity [mPa·s] of an ink, θ represents a contact angle [°] between a recording medium and the ink, and t represents time [s]. A larger penetration distance L indicates that the ink more readily penetrates into the recording medium. As is clear from the following equation, an ink having a higher wetting tension (γ cos θ) more readily penetrates into the recording medium.

$$L = \sqrt{\frac{r\gamma\cos\theta}{2\eta}t}$$

In the inkjet recording apparatus according to the present embodiment, the ink to be ejected second and the ink to be subsequently ejected each have a polyhydric alcohol monobutyl ether content ratio higher than that of a corresponding one of inks to be precedently ejected. A polyhydric alcohol monobutyl ether has a hydroxy group and a butoxy group. The hydroxy group increases solubility of the polyhydric alcohol monobutyl ether in ink and the butoxy group acts to increase wetting tension of the ink, thereby improving penetrability of the ink into a recording medium. Therefore, the inks used in the inkjet recording apparatus according to the present embodiment are excellent in penetrability into a recording medium as a result of containing the polyhydric alcohol monobutyl ether. Furthermore, in the inkjet recording apparatus according to the present embodiment, an ink to be ejected later has a higher polyhydric alcohol monobutyl ether content ratio (i.e., is an ink excellent in penetrability into a recording medium). As such, in the inkjet recording apparatus according to the present embodiment, even an ink to be ejected relatively later in order of ejection to a recording medium can be sufficiently penetrated into the recording medium by adjusting each content ratio of the pigment and the polyhydric alcohol monobutyl ether as described above according to the order of ejection to the recording medium. Thus, offset of a formed image can be prevented.

Figure 1:
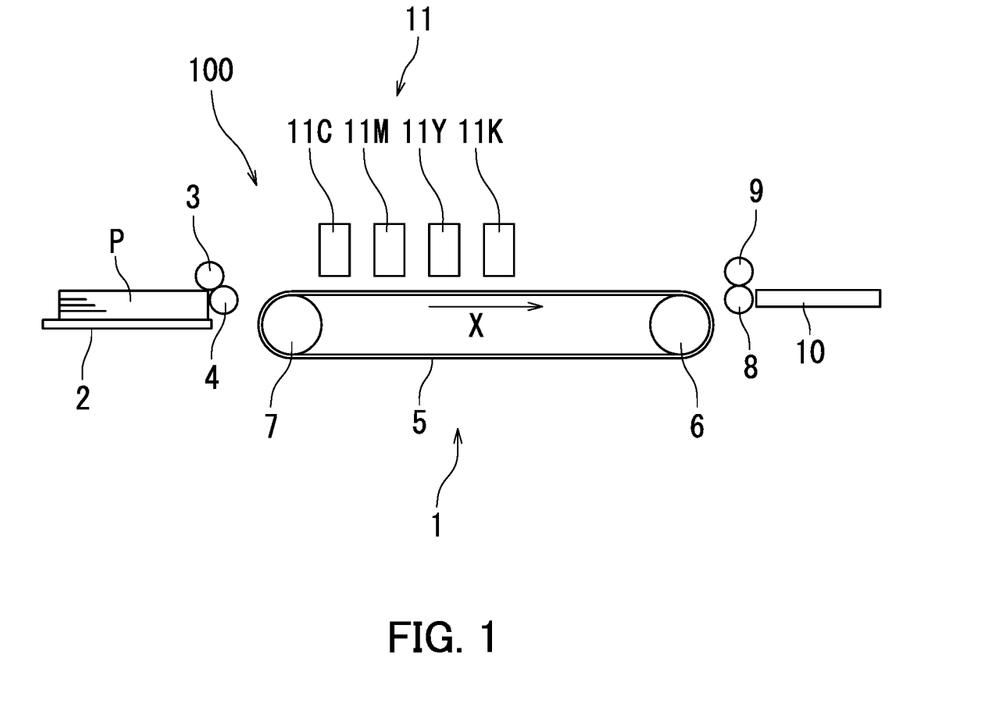
FIG. 1 is a diagram illustrating a configuration of an inkjet recording apparatus.
Figure 2:
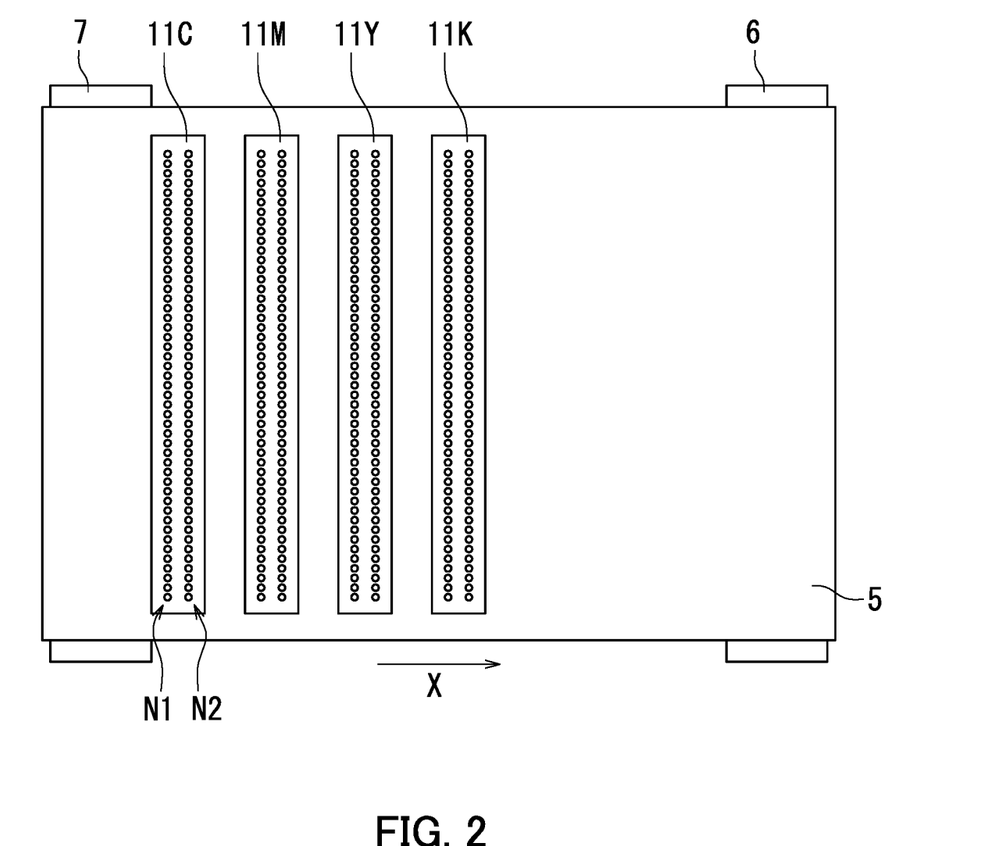
FIG. 2 is a view of a conveyor belt of the inkjet recording apparatus illustrated in FIG. 1 as viewed from above.

The following describes the inkjet recording apparatus according to the present embodiment with reference to the drawings. The drawings schematically illustrate elements of configuration in order to facilitate understanding. The elements of configuration illustrated in the drawings may differ from actual ones in properties such as size and the number thereof in order to facilitate preparation of the drawings. FIG. 1 is a diagram illustrating a configuration of an inkjet recording apparatus 100. FIG. 2 is a view of a conveyor belt 5 of the inkjet recording apparatus 100 illustrated in FIG. 1 as viewed from above.

As illustrated in FIG. 1, the inkjet recording apparatus 100 includes a conveyance section 1 and a recording head group 11 as main elements of configuration. The inkjet recording apparatus 100 further includes a sheet feed tray 2, a sheet feed roller 3, a sheet feed driven roller 4, a conveyor belt 5, a belt drive roller 6, a belt driven roller 7, an ejection roller 8, an ejection driven roller 9, and an exit tray 10. The conveyor belt 5, the belt drive roller 6, and the belt driven roller 7 constitute part of the conveyance section 1. The sheet feed tray 2 is provide at a left end of the inkjet recording apparatus 100 in the drawing. Recording sheets P (recording mediums) are loaded on the sheet feed tray 2. The sheet feed roller 3 and the sheet feed driven roller 4 are disposed at an end of the sheet feed tray 2. The sheet feed roller 3 picks up the loaded recording sheets P one at a time from a topmost recording sheet P and feeds the recording sheet P to the conveyor belt 5 for conveyance. The sheet feed driven roller 4 is in contact by pressure with the sheet feed roller 3 to passively rotate.

The conveyor belt 5 is arranged downstream of the sheet feed roller 3 and the sheet feed driven roller 4 (right side in FIG. 1) in terms of a conveyance direction X of the recording sheet P in a circulatable manner. The conveyor belt 5 is wound between the belt drive roller 6 and the belt driven roller 7. The belt drive roller 6 is disposed downstream of the belt driven roller 7 in terms of the conveyance direction X of the recording sheet P. The belt drive roller 6 drives to circulate the conveyor belt 5. The belt driven roller 7 is disposed upstream of the belt drive roller 6 in terms of the conveyance direction X of the recording sheet P. The belt driven roller 7 passively rotates with rotation of the belt drive roller 6 through the conveyor belt 5. When the belt drive roller 6 drives and rotates clockwise in the drawing, the recording sheet P is conveyed in the conveyance direction X of the recording sheet P indicated by an arrow in FIG. 1.

The ejection roller 8 and the ejection driven roller 9 are disposed downstream of the conveyor belt 5 in terms of the conveyance direction X. The ejection roller 8 is driven and rotated clockwise in the drawing to eject the recording sheet P with an image formed thereon out of an apparatus casing. The ejection driven roller 9 is in contact by pressure with an upper part of the ejection roller 8 to passively rotate. The exit tray 10 is disposed downstream of the ejection roller 8 and the ejection driven roller 9 in terms of the conveyance direction X. The exit tray 10 receives the recording sheet P ejected out of the apparatus casing.

The recording head group 11 includes recording heads 11C, 11M, 11Y, and 11K. The recording heads 11C, 11M, 11Y, and 11K are arranged above the conveyor belt 5 in the stated order from upstream to downstream in terms of the conveyance direction X of the recording sheet P. Each of the recording heads 11C to 11K is supported at a level a specific distance apart from an upper surface of the conveyor belt 5. The recording heads 11C to 11K each record an image on the recording sheet P conveyed by the conveyor belt 5. The recording heads 11C to 11K contain respective four inks different in color from one another (specifically, a cyan ink, a magenta ink, a yellow ink, and a black ink). As a result of ink ejection by the recording heads 11C to 11K, a color image is formed on the recording sheet P.

Specifically, the recording heads 11C to 11K sequentially eject the respective inks contained therein to the recording sheet P in the order of the recording head 11C, the recording head 11M, the recording head 11Y, and the recording head 11K. That is, the recording head 11C is the first recording head that contains the first ink. The recording head 11M is the second recording head that contains the second ink. The recording head 11Y is the third recording head that contains the third ink. The recording head 11K is the fourth recording head that contains the fourth ink.

Respective relationships in the polyhydric alcohol monobutyl ether content ratio and the pigment content ratio described below are established among the first to fourth inks. The inkjet recording apparatus 100 can prevent offset of an image formed as described above by sequentially ejecting the first to fourth inks in the relationships.

Pigment content ratio: first ink<second ink≤third ink≤fourth ink

Polyhydric alcohol monobutyl ether content ratio: first ink<second ink<third ink<fourth ink As illustrated in FIG. 2, the recording heads 11C to 11K each are a long recording head. A longitudinal direction of each recording head 11C to 11K is perpendicular to the conveyance direction X of the recording sheet P. Each of the recording heads 11C to 11K includes a nozzle row N1 and a nozzle row N2. Each of the nozzle rows N1 and N2 includes a plurality of nozzles arranged in a direction perpendicular to the conveyance direction X of the recording sheet P. The nozzle rows N1 and N2 are arranged side by side in the conveyance direction X of the recording sheet P. The recording heads 11C to 11K may each be called a line type recording head or long inkjet recording head. A recording region of each of the recording heads 11C to 11K is wider than or equal to a width of the conveyed recording sheet P. The nozzles of each of the nozzle rows N1 and N2 are capable of recording one-line image in batches on the recording sheet P conveyed by the conveyor belt 5.

Note that the inkjet recording apparatus 100 includes the recording heads 11C to 11K of which the recording regions are each wider than or equal to the width of the recording sheet P. However, the inkjet recording apparatus according to the present embodiment may for example include recording head units including a plurality of short recording heads arranged side by side in series in a width direction of the conveyor belt 5. The short recording heads are arranged such that a total width of recording regions of the short recording heads is wider than or equal to the width of the recording sheet P.

Figure 3:
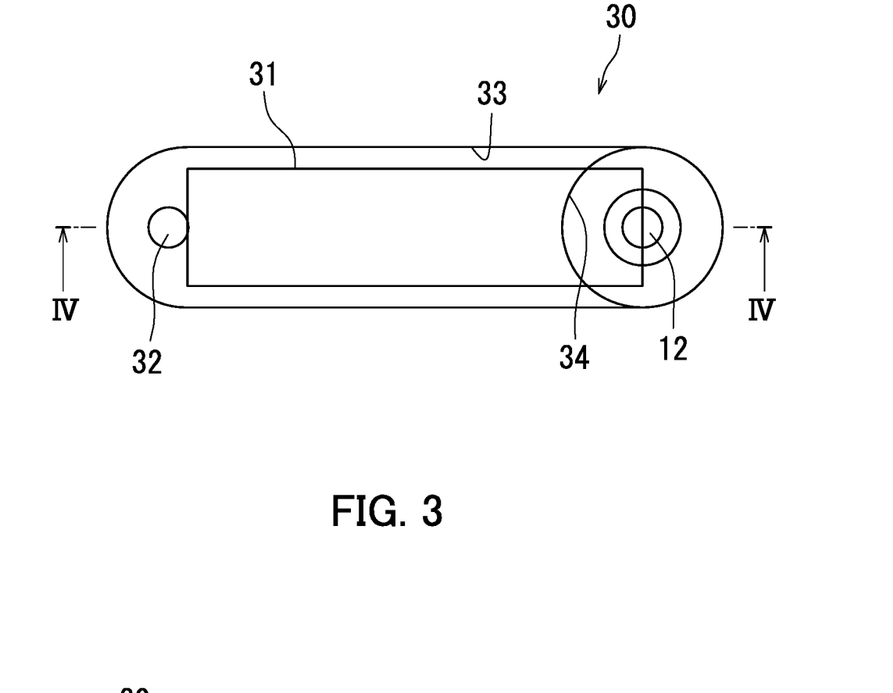
FIG. 3 is a diagram illustrating an ejection unit of a recording head illustrated in FIG. 2.
Figure 4:
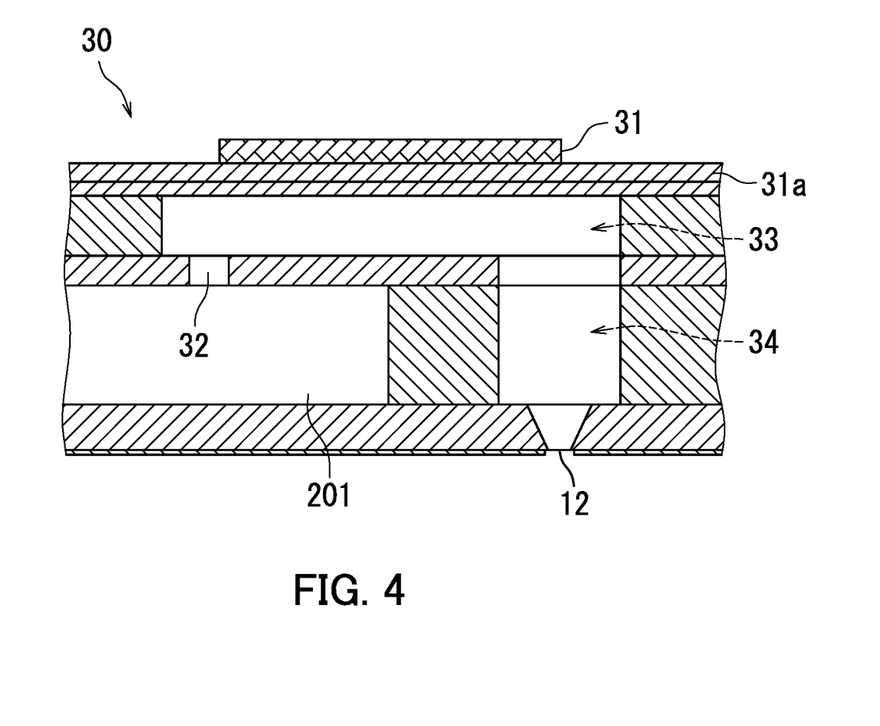
FIG. 4 is a cross-sectional view taken along a line IV-IV in FIG. 3.

The following describes a configuration of an ejection unit 30 included in each of the recording heads 11C to 11K with reference to FIGS. 3 and 4. FIG. 3 is a diagram illustrating the ejection unit 30. FIG. 4 is a cross-sectional view taken along a line IV-IV in FIG. 3.

As illustrated in FIGS. 3 and 4, the ejection unit 30 includes a nozzle 12, an actuator 31, a diaphragm 31a, a hole 32, a pressure chamber 33, and a nozzle flow channel 34. The hole 32, the pressure chamber 33, the nozzle flow channel 34, and the nozzle 12 communicate with one another. The pressure chamber 33 communicates with a common flow channel 201 through the hole 32. A corresponding one of the inks is supplied to the common flow channel 201 by for example a non-illustrated pump from a non-illustrated ink tank.

The actuator 31 includes for example a piezoelectric element. Voltage application to the piezoelectric element (actuator 31) deforms the piezoelectric element by inverse piezoelectric effect. Deformation of the piezoelectric element is transmitted to the pressure chamber 33 through the diaphragm 31a. As a result, the pressure chamber 33 is compressed. The ink sent to the pressure chamber 33 from the common flow channel 201 through the hole 32 is pressurized in the pressure chamber 33 by the actuator 31 to be ejected from the nozzle 12 via the nozzle flow channel 34.

Figure 5:
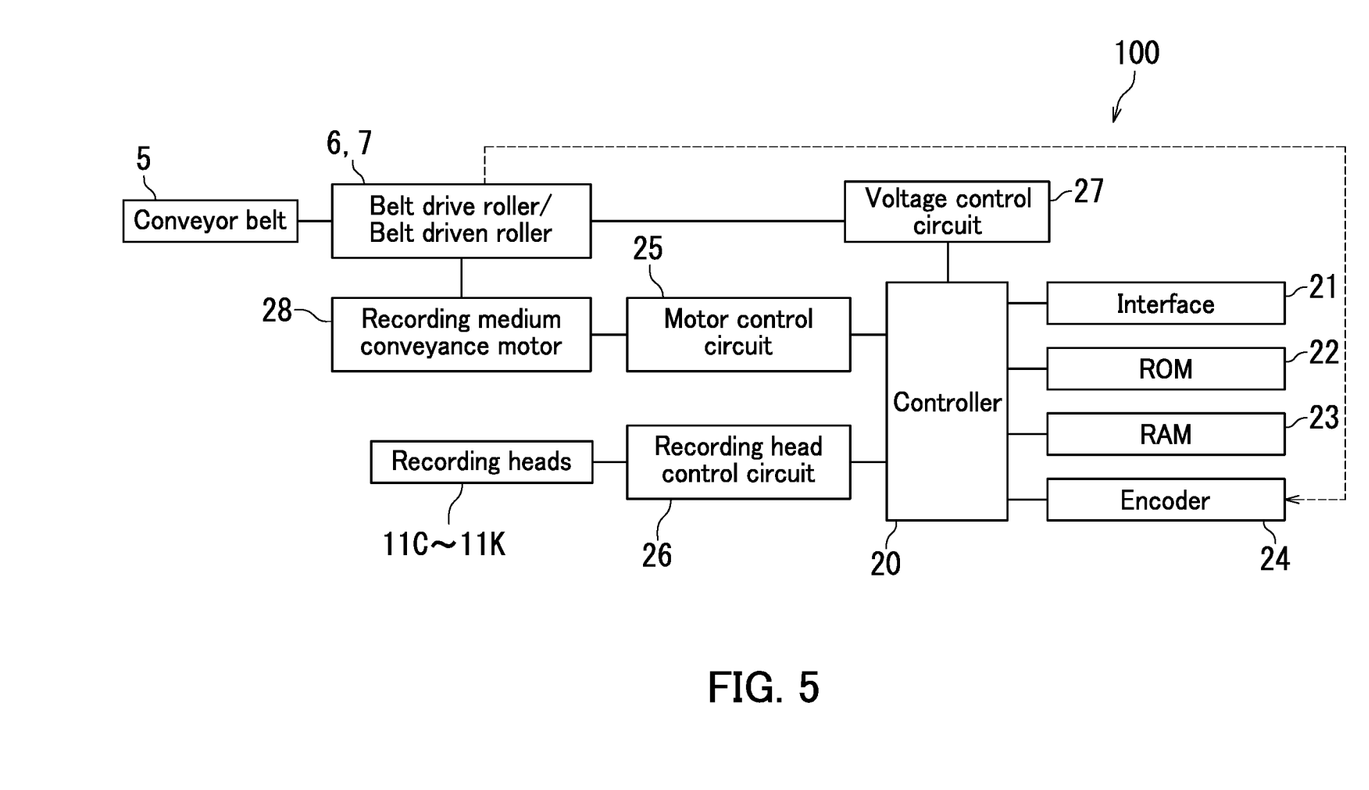
FIG. 5 is a block diagram illustrating the configuration of the inkjet recording apparatus.

FIG. 5 is a block diagram illustrating the configuration of the inkjet recording apparatus 100. The same reference signs are assigned to elements of configuration common to those in FIGS. 1 and 2, and description thereof is omitted. The inkjet recording apparatus 100 further includes a controller 20, an interface 21, read-only memory (ROM) 22, random-access memory (RAM) 23, an encoder 24, a motor control circuit 25, a recording head control circuit 26, a voltage control circuit 27, and a recording medium conveyance motor 28. The interface 21, the ROM 22, the RAM 23, the encoder 24, the motor control circuit 25, the recording head control circuit 26, and the voltage control circuit 27 are connected to the controller 20.

The interface 21 transmits and receives data to and from for example a host device such as a personal computer. The controller 20 receives an image signal via the interface 21 and performs a scaling process or a grayscale process as necessary to covert the image signal to image data. The controller 20 then outputs a control signal to various control circuits which will be described later.

The ROM 22 stores therein for example a control program to drive the recording heads 11C to 11K for image recording. The RAM 23 stores in a specific region thereof image data after the scaling process or the grayscale process by the controller 20.

The encoder 24 is connected to the belt drive roller 6. The encoder 24 outputs (transmits) a pulse train to the controller 20 according to an amount of rotational displacement of a rotational axis of the belt drive roller 6. The controller 20 calculates an amount of rotation by counting pulses transmitted from the encoder 24 to recognize a feed amount of the recording sheet P (sheet position). The controller 20 outputs the control signal to the motor control circuit 25 and the recording head control circuit 26 based on a signal from the encoder 24.

The motor control circuit 25 drives the recording medium conveyance motor 28 according to the output signal from the controller 20. The recording medium conveyance motor 28 drives to rotate the belt drive roller 6.

The recording head control circuit 26 transfers the image data stored in the RAM 23 to the recording heads 11C to 11K based on the output signal from the controller 20. The recording head control circuit 26 controls ink ejection by the recording heads 11C to 11K based on the transferred image data. Through such ink ejection control on the recording heads 11C to 11K by the recording head control circuit 26 and control of conveyance of the recording sheet P by the motor control circuit 25, recording is performed on the recording sheet P.

The voltage control circuit 27 generates an alternating electric field by applying voltage to the belt driven roller 7 located on a side where a sheet is fed from the sheet feed roller 3 based on the output signal from the controller 20. The generated alternating electric field causes the recording sheet P to electrostatically adhere to the conveyor belt 5. The electrostatic adhesion is released by grounding the belt driven roller 7 or the belt drive roller 6 based on the output signal from the controller 20. Note that voltage is applied to the belt driven roller 7 in the present embodiment. However, voltage may be applied to the belt drive roller 6.

In the inkjet recording apparatus 100, as illustrated in FIG. 2, the two nozzle rows N1 and N2 of each of the recording heads 11C to 11K are arranged side by side in terms of the conveyance direction X of the recording sheet P (left-right direction in FIG. 2). Ink ejection from the nozzles of the two nozzle rows N1 and N2 arranged side by side in the conveyance direction X forms dots on the recording sheet P conveyed by the conveyor belt 5.

An example of the inkjet recording apparatus according to the present embodiment has been described so far. However, the inkjet recording apparatus according to the present embodiment is not limited to the apparatus illustrated in FIGS. 1 to 5.

The inkjet recording apparatus 100 including the four recording heads 11C to 11K containing the respective four inks has been described with reference to FIGS. 1 to 5. However, the number of the recording heads included in the inkjet recording apparatus according to the present embodiment is not particularly limited and may be any number larger than 2, and may be for example at least 3 and no greater than 10. At least 3 and no greater than 5 is preferable.

The inkjet recording apparatus 100 ejects inks in four colors of cyan, magenta, yellow, and black in the stated order, but type and combination of the inks and order of ejection are not limited to those in the above example. The inkjet recording apparatus according to the present embodiment may eject for example inks in three colors of magenta, yellow, and cyan in the stated order, eject inks in three colors of yellow, magenta, and cyan in the stated order, or eject inks in three colors of cyan, yellow, and magenta in the state order. However, a cyan ink typically tends to have a relatively low pigment content ratio in order to prevent change in hue angle. A magenta ink tends to have a relatively high pigment content ratio in order to ensure sufficiently high color developability. Therefore, in a situation in which the cyan ink and the magenta ink are used in the inkjet recording apparatus according to the present embodiment, the cyan ink is preferably ejected earlier than the magenta ink.

The number of nozzles and nozzle intervals of each of the nozzle rows N1 and N2 of each recording head 11C to 11K can be set as appropriate according to specification of the apparatus.

The two nozzle rows N1 and N2 are arranged side by side in the conveyance direction X in each of the recording heads 11C to 11K. However, 3 or more nozzle rows may be arranged side by side in each of the recording heads 11C to 11K in the inkjet recording apparatus according to the present embodiment to allow the nozzles of the nozzle rows to sequentially form dot rows. The larger the number of the nozzle rows is, the less frequently defective dots appear in the dot rows. Thus, white lines are hardly perceivable. The inkjet recording apparatus according to the present embodiment may be a multifunction peripheral having respective functions of a scanner, a copier, a printer, and a facsimile machine.

[Inks]

The following describes the inks used in the inkjet recording apparatus according to the present embodiment in detail. The inks each contain a pigment and a polyhydric alcohol monobutyl ether. Preferably, the inks may each further contain water. The inks may each further contain a surfactant, a moisturizing agent, a solution stabilizer, or a penetrating agent different from the polyhydric alcohol monobutyl ether.

Each of the inks preferably has a viscosity at 25° C. of at least 3.5 mPa·s and no greater than 10.0 mPa·s, and more preferably has a viscosity at 25° C. of at least 3.5 mPa·s and no greater than 7.0 mPa·s. As a result of the ink having a viscosity at 25° C. of at least 3.5 mPa·s and no greater than 10.0 mPa·s, ejection stability can be improved.

Note that a viscosity of the ink is measured using a falling ball type viscometer. An examples of a falling ball type viscometer that can be used is a falling ball type automatic micro-viscometer ("AMVn", product of Anton Paar Japan K.K.).

(Pigment)

Examples of pigments include yellow pigments, orange pigments, red pigments, blue pigments, violet pigments, and black pigments. Examples of yellow pigments include C.I. Pigment Yellow (74, 93, 95, 109, 110, 120, 128, 138, 139, 151, 154, 155, 173, 180, 185, or 193). Examples of orange pigments include C.I Pigment Orange (34, 36, 43, 61, 63, or 71). Examples of red pigments include C.I. Pigment Red (122 or 202). Examples of blue pigments include C.I. Pigment Blue (15, more specifically, 15:3). Examples of violet pigments include C.I Pigment Violet (19, 23, or 33). Examples of black pigments include C.I. Pigment Black (7).

Each ink preferably has a pigment content ratio of at least 3.0% by mass and no greater than 9.0% by mass. As a result of the pigment content ratio being at least 3.0% by mass, a desired image density can be easily attained. As a result of the pigment content ratio being no greater than 9.0% by mass, fluidity of the pigment in the ink increases, thereby easily attaining a desired image density. In addition, as a result of the pigment content ratio being no greater than 9.0% by mass, penetrability of the ink into a recording medium can be improved.

The pigment is dispersed in the ink in the form of particles (also referred to below as pigment particles). The pigment particles may include only the pigment. Alternatively, the pigment particles may include the pigment and resin particles covering the surface of the pigment (also referred to below as covering resin particles).

The covering resin particles cover the surface of the pigment to increase dispersibility of the pigment. No particular limitations are placed on a resin contained in the covering resin particles, and examples of the resin contained in the covering resin particles include (meth)acrylic resins, styrene-(meth)acrylic resins, styrene-maleate copolymers, vinylnaphthalene-(meth)acrylate copolymers, and vinylnaphthalene-maleate copolymers. (Meth)acrylic resins are resins each including a repeating unit derived from at least one monomer selected from the group consisting of (meth)acrylate and (meth)acrylate ester. Styrene-(meth)acrylic resins are resins each including a repeating unit derived from styrene and a repeating unit derived from at least one monomer selected from the group consisting of (meth)acrylate and (meth)acrylate ester. Examples of styrene-(meth)acrylic resins include styrene-acrylate-alkyl acrylate ester copolymers, styrene-methacrylate-alkyl methacrylate ester-alkyl acrylate ester copolymers, styrene-acrylate copolymers, styrene-maleate-alkyl acrylate ester copolymers, styrene-methacrylate copolymers, and styrene-alkyl methacrylate ester copolymers. As the resin contained in the covering resin particles, styrene-methacrylate-alkyl methacrylate ester-alkyl acrylate ester copolymers and styrene-acrylate copolymers are preferable, and a styrene-methacrylate-methyl methacrylate-butyl acrylate copolymer is more preferable.

The resin contained in the covering resin particles preferably has an acid value of at least 60 mgKOH/g and no greater than 300 mgKOH/g, and more preferably has an acid value of at least 80 mgKOH/g and no greater than 150 mgKOH/g. As a result of the acid value of the resin contained in the covering resin particles being at least 60 mgKOH/g, dispersibility of the pigment particles can be increased. As a result of the acid value of the resin contained in the covering resin particles being no greater than 300 mgKOH/g, preservation stability of the ink can be increased.

In a situation in which the ink contains the covering resin particles, the covering resin particles are preferably contained in the ink in an amount of at least 15 parts by mass and no greater than 100 parts by mass relative to 100 parts by mass of the pigment.

In terms of improving color density, hue, and stability of the ink, the pigment particles preferably have a volume median diameter ($D_{50}$) of at least 30 nm and no greater than 200 nm, and more preferably have a volume median diameter ($D_{50}$) of at least 70 nm and no greater than 130 nm.

(Polyhydric Alcohol Monobutyl Ether)

Polyhydric alcohol monobutyl ether improves penetrability of an ink into a recording medium. A preferable polyhydric alcohol monobutyl ether is a compound represented by the following general formula (I). In general formula (I) below, the butyl group represented by $C_4H_9$ may be any of a n-butyl group, a sec-butyl group, an isobutyl group, and a tert-butyl group, and preferably a n-butyl group.

$$H\text{---}(OR)_n\text{---}OC_4H_9 \quad (I)$$

In general formula (I), R represents an alkylene group having a carbon number of at least 2 and no greater than 4. n represents an integer of at least 1 and no greater than 5. Preferably, R represents a 1,2-ethanediyl group. Preferably, n represents an integer of at least 1 and no greater than 3.

The polyhydric alcohol monobutyl ether is preferably ethylene glycol monobutyl ether, diethylene glycol monobutyl ether, or triethylene glycol monobutyl ether, and more preferably ethylene glycol mono-n-butyl ether, diethylene glycol mono-n-butyl ether, or triethylene glycol mono-n-butyl ether.

The polyhydric alcohol monobutyl ether content ratio in each ink is preferably at least 3.0% by mass and no greater than 20.0% by mass.

(Water)

In a case where the ink contains water, the ink preferably contains water in an amount of at least 20% by mass and no greater than 70% by mass.

(Surfactant)

Surfactants improve wettability of an ink to a recording medium. Preferable examples of the surfactants include nonionic surfactants.

Examples of nonionic surfactants that can be preferably used include acetylene glycol-based surfactants and acrylate polyalkylene glycol alkyl ether-alkyl acrylate-acrylate polyalkylene glycol-lauryl acrylate-alkyl methacrylate copolymers. An acetylene glycol-based surfactant or an acrylate polyethylene glycol methyl ether-butyl acrylate-acrylate polypropylene glycol-lauryl acrylate-methyl methacrylate copolymer is more preferable.

An example of commercially available acetylene glycol-based surfactants is "OLFINE (registered Japanese trademark) E1010" (product of Nissin Chemical Industry Co., Ltd.). "OLFINE (registered Japanese trademark) E1010" is a surfactant including an ethylene oxide adduct of acetylene diol.

In a case where the ink contains a surfactant, the surfactant is preferably contained in the ink in an amount of at least 0.5% by mass and no greater than 5.0% by mass in terms of further preventing offset of a formed image and improving image density.

(Solution Stabilizer)

Solution stabilizers stabilize a solution state of an ink through improvement of compatibility of respective components included in the ink. Examples of the solution stabilizer include 2-pyrrolidone, N-methyl-2-pyrrolidone, and γ-butyrolactone. In a case where the ink contains a solution stabilizer, the solution stabilizer is preferably contained in the ink in an amount of at least 1.0% by mass and no greater than 20.0% by mass, and more preferably contained therein in an amount of at least 3.0% by mass and no greater than 15.0% by mass.

(Moisturizing Agent)

Moisturizing agents inhibit volatilization of liquid components from an ink (particularly, a water-based ink containing water) and stabilize viscosity of the ink. Examples of the moisturizing agents include polyalkylene glycol compounds, alkylene glycol compounds, and glycerin. Examples of polyalkylene glycol compounds that can be preferably used include polyethylene glycol and polypropylene glycol. Examples of alkylene glycol compounds include ethylene glycol, propylene glycol, butylene glycol, diethylene glycol, dipropylene glycol, trimethylene glycol (1,3-propanediol), triethylene glycol, tripropylene glycol, 1,2,6-hexanetriol, thiodiglycol, 1,3-butanediol, 1,5-pentanediol, and 3-methyl-1,5-pentanediol. A preferable moisturizing agent is 3-methyl-1,5-pentanediol. In a case in which the ink contains a moisturizing agent, the moisturizing agent is contained preferably in an amount of at least 5.0% by mass and no greater than 60.0% by mass.

(Penetrating Agent)

Penetrating agents improve penetrability of an ink into a recording medium. Examples of the penetrating agents include 1,2-hexylene glycol, 1,2-octanediol, 2,4-diethyl-1,5-pentanediol, and 2-butyl-2-ethyl-1,3-propanediol. A preferable penetrating agent is 1,2-octanediol. In a case where the ink contains a penetrating agent, the penetrating agent is preferably contained in the ink in an amount of at least 0.1% by mass and no greater than 10.0% by mass, and more preferably contained in the ink in an amount of at least 0.3% by mass and no greater than 2.0% by mass.

A plurality of inks are used in the inkjet recording apparatus according to the present embodiment. As described above, the inks differ from one another in the pigment content ratio and the polyhydric alcohol monobutyl ether content ratio.

The pigment content ratio of the first ink is preferably at least 3.0% by mass and no greater than 8.0% by mass, and more preferably at least 5.0% by mass and no greater than 7.0% by mass. As a result of the pigment content ratio of the first ink being in the above value range, images having an appropriate density can be formed.

A difference in pigment content ratio between the first ink and the second ink is preferably at least 0.5% by mass and no greater than 2.5% by mass, and more preferably at least 0.5% by mass and no greater than 1.5% by mass. As a result of the above-mentioned difference being in the above value range, images having an appropriate density can be formed.

Differences in pigment content ratio between the third to last inks and respective inks to be precedently ejected (for example, a difference in pigment content ratio between the third ink and the second ink) each are preferably no greater than 2.5% by mass, and more preferably at least 0.5% by mass and no greater than 1.5% by mass. As a result of the above-mentioned differences being in the above value range, images having an appropriate density can be formed.

The pigment content ratio of the last ink is preferably at least 5.0% by mass and no greater than 9.0% by mass, and more preferably at least 7.0% by mass and no greater than 9.0% by mass. As a result of the pigment content ratio of the last ink being in the above value range, images having an appropriate density can be formed.

The polyhydric alcohol monobutyl ether content ratio of the first ink is preferably at least 3.0% by mass and no greater than 8.0% by mass, and more preferably at least 3.5% by mass and no greater than 5.0% by mass. As a result of the polyhydric alcohol monobutyl ether content ratio of the first ink being in the above value range, the first ink can have improved penetrability.

A difference in polyhydric alcohol monobutyl ether content ratio between the first ink and the second ink is preferably at least 0.5% by mass and no greater than 1.5% by mass. As a result of the above-mentioned difference being in the above value range, the second ink can have improved penetrability.

Differences in polyhydric alcohol monobutyl ether content ratio between the third to last inks and respective inks to be precedently ejected (for example, a difference in polyhydric alcohol monobutyl ether content ratio between the third ink and the second ink) each are preferably at least 1.5% by mass and no greater than 4.0% by mass, and more preferably at least 1.5% by mass and no greater than 2.5% by mass. As a result of the above-mentioned differences being in the above value range, the third to last inks can have improved penetrability into a recording medium.

The polyhydric alcohol monobutyl ether content ratio of the last ink is preferably at least 5.0% by mass and no greater than 20.0% by mass, and more preferably at least 6.0% by mass and no greater than 8.0% by mass. As a result of the polyhydric alcohol monobutyl ether content ratio of the last ink being in the above value range, the last ink can have improved penetrability into a recording medium.

Preferably, the inks differ from one another in only one of: type and content ratio of the pigment; content ratio of the covering resin particles; content ratio of the polyhydric alcohol monobutyl ether; and content ratio of water. That is, the inks are preferably the same as one another in type of the covering resin particles, type of the polyhydric alcohol monobutyl ether, and types and content ratios of other components (for example, the surfactant, the moisturizing agent, the penetrating agent, and the solution stabilizer).

(Other Components)

The inks may each contain a known additive (specific examples include an anti-drying agent, an antioxidant, a viscosity modifier, a pH adjuster, and an antifungal agent) as necessary.

[Ink Production Method]

No particular limitations are placed on an ink production method so long as the method enables uniform mixing of a pigment and other components blended as necessary. A specific example of the ink production method is a method in which components of an ink are stirred using a stirrer to be uniformly mixed and foreign matter and coarse particles are removed from the resultant mixture using a filter (for example, a filter having a pore size of no greater than 5 μm).

In a preferable ink production method, a pigment dispersion in which pigment particles are dispersed in water is prepared by mixing water, a pigment, and covering resin particles and a surfactant, which are blended as necessary, and the prepared pigment dispersion is then mixed with the other component(s). In a case where covering resin particles having an acid group are used in ink production, it is preferable to perform equivalent neutralization on the covering resin particles using an aqueous solution of potassium hydroxide or the like before preparation of the pigment dispersion.

In a case where water is added in ink production, ion exchanged water is preferably added.

The inkjet recording apparatus according to the present embodiment and the inks used in the inkjet recording apparatus have been described so far. The inkjet recording apparatus according to the present embodiment can prevent image offset that may occur that may occur through sequential ejection of the inks.

Second Embodiment: Inkjet Recording Method

An inkjet recording method according to the present embodiment includes sequentially ejecting three or more different inks onto a recording medium. Each of the different inks contains a pigment and a polyhydric alcohol monobutyl ether. Of the different inks, an ink to be ejected first has the lowest pigment content ratio. Of the different inks, an ink to be ejected third and an ink to be subsequently ejected each have a pigment content ratio equal to or higher than that of a corresponding one of inks to be precedently ejected. Of the different inks, an ink to be ejected second and an ink to be subsequently ejected each have a polyhydric alcohol monobutyl ether content ratio higher than that of a corresponding one of inks to be precedently ejected.

The inks used in the inkjet recording method according to the present embodiment may be the same as the inks used in the inkjet recording apparatus according to the first embodiment. The inkjet recording method according to the present embodiment can be implemented for example through use of the inkjet recording apparatus according to the first embodiment. The inkjet recording method according to the present embodiment can prevent image offset that may occur through sequential ejection of the inks.

EXAMPLES

The following describes examples of the present disclosure. However, the present disclosure is in no way limited to the following examples.

(Preparation of Pigment Dispersion C)

A 0.6-L vessel was charged with a cyan pigment ("LIONOL (registered Japanese trademark) BLUE FG-7330", product of TOYOCOLOR CO., LTD., component: copper phthalocyanine, color index: Pigment Blue 15:3), later-described covering resin particles A, a surfactant ("OLFINE (registered Japanese trademark) E1010", product of Nissin Chemical Industry Co., Ltd), and ion exchanged water at a ratio shown in Table 1 below. Subsequently, the vessel contents were mixed using a media type wet disperser ("DYNO (registered Japanese trademark)-MILL", product of Willy A. Bachofen AG (WAB)).

TABLE 1

| | Content ratio [% by mass] |
|---|---|
| Covering resin particles A | 6.0 |
| Cyan pigment | 15.0 |
| Surfactant | 0.5 |
| Water | Remainder |
| Total | 100.0 |

The covering resin particles A used were resin particles (volume median diameter ($D_{50}$): 100 nm) constituted by an alkaline-soluble methacrylic acid (MAA)-methyl methacrylate (MMA)-butyl acrylate (BA)-styrene (ST) copolymer (mass average molecular weight (Mw): 20,000, acid value: 100 mgKOH/g). The covering resin particles A were anionic. A mass ratio of a repeating unit derived from MAA, a repeating unit derived from MMA, a repeating unit derived from BA, and a repeating unit derived from ST (MAA unit/MMA unit/BA unit/ST unit) was 40/15/30/15 in the resin constituting the covering resin particles A.

Each mass average molecular weight (Mw) of the covering resin particles A and a later-described nonionic surfactant was measured by a gel permeation chromatography ("HLC-8020GPC", product of Tosoh Corporation) under the following conditions. In the measurement, a calibration curve was plotted using n-propylbenzene and F-40, F-20, F-4, F-1, A-5000, A-2500, and A-1000, which are TSKgel standard polystyrenes produced by Tosoh Corporation.

(Conditions for Measuring Mass Average Molecular Weight)
Column: "TSKgel SuperMultipore HZ-H" (product of Tosoh Corporation, semi-micro column having an internal diameter of 4.6 mm and a length of 15 cm)
Number of columns: 3
Eluent: Tetrahydrofuran
Flow rate: 0.35 mL/minute
Sample injection amount: 10 μL
Measurement temperature: 40° C.
Detector: Infrared (IR) detector Note that the covering resin particles A were subjected to equivalent neutralization with an aqueous KOH solution of 105% by mass and then used for preparation of the pigment dispersion C. An amount of KOH added was calculated based on the mass of the copolymer that was a neutralization target. Note that "Water" in Table 1 includes water generated in reaction for neutralizing the covering resin particles A and water included in the aqueous KOH solution used for neutralization of the covering resin particles A in addition to ion exchanged water charged into the vessel.

Subsequently, a medium (zirconia beads having a particle diameter of 0.5 mm) was charged into the vessel to adjust a dispersion state so that the pigment particles had a desired volume median diameter ($D_{50}$). Specifically, the medium (zirconia beads) in an amount of 70% by mass relative to the capacity of the vessel was charged into the vessel, and was dispersed into the vessel contents under conditions of a temperature of 10° C. and a peripheral speed of 8 m/second while the vessel contents were cooled with water. Through the above, a pigment dispersion C was obtained that included pigment particles having a volume median diameter ($D_{50}$) of 100 nm (pigment particles of the cyan pigment covered with the covering resin particles A).

As for the volume median diameter ($D_{50}$) of the pigment particles, median diameters ($D_{50}$) of measurement samples were measured using a dynamic light scattering type particle size distribution analyzer ("ZERASIZER NANO ZS", product of Sysmex Corporation). The measurement samples each were a solution obtained by diluting the pigment dispersion C with ion exchanged water by 300 times. In the measurement, 10 measurement samples were prepared and each volume median diameter ($D_{50}$) of the 10 measurement samples was measured. An arithmetic mean value of the measured ten measurement values was taken to be a volume median diameter ($D_{50}$) of the pigment particles.

(Preparation of Pigment Dispersion Y and Pigment Dispersion M)

A pigment dispersion Y and a pigment dispersion M were prepared according to the same method as for the pigment dispersion C in all aspects other than the following changes. While the cyan pigment was used in preparation of the pigment dispersion C, a yellow pigment ("FY840 (Fast Yellow74)", product of Dainichiseika Color & Chemicals Mfg. Co., Ltd., component: 2-[(2-methoxy-4-nitrophenyl)azo]-N-(2-methoxyphenyl)-3-oxobutanamide, color index: Pigment Yellow74) was used in preparation of the pigment dispersion Y and a magenta pigment ("FASTOGENSUPER MAGENTA R", product of Dainichiseika Color & Chemicals Mfg. Co., Ltd., comment: 2,9-dimethylquinacridone, color index: Pigment Red122) was used in preparation of the pigment dispersion M.

[Preparation of Inks]

With respect to each of the pigment dispersions C, M, and Y, components of types and content ratios shown in Tables 2 and 3 below were loaded into a stirrer ("THREE-ONE MOTOR BL-600", product of Shinto Scientific Co., Ltd.) and stirred at a rotational speed of 400 rpm for uniform mixing. The above-described pigment dispersions C, M, and Y were used as pigment dispersions in Tables 2 and 3 below. Ethylene glycol mono-n-butyl ether, diethylene glycol mono-n-butyl ether, triethylene glycol mono-n-butyl ether, and diethylene glycol monoisopropyl ether were each used as a penetrating agent. In order to remove foreign matter and coarse particles from the resultant mixture, the resultant mixture was filtrated using a filter having a pore size of 5 μm. Through the above, magenta inks (M-1) to (M-8), yellow inks (Y-1) to (Y-7), and cyan inks (C-1) to (C-8) were obtained.

TABLE 2

| | % by mass |
|---|---|
| Pigment dispersion | See Table 3 |
| Penetrating agent | See Table 3 |
| 3-Methyl-1,5-pentanediol | 10.0 |
| 2-Pyrrolidone | 7.0 |

TABLE 2-continued

| | % by mass |
|---|---|
| Nonionic surfactant | 2.5 |
| 1,2-Octanediol | 0.5 |
| Ion exchanged water | Remainder |
| Total | 100.0 |

The nonionic surfactant shown in Table 2 was a polyethylene glycol methyl ether acrylate (PEGA)-butyl acrylate (BA)-polypropylene glycol acrylate (PPGA)-lauryl acrylate (LA)-methyl methacrylate (MMA) copolymer. In the copolymer, a mass ratio of a repeating unit derived from PEGA, a repeating unit derived from BA, a repeating unit derived from PPGA, a repeating unit derived from LA, and a repeating unit derived from MMA (PEGA unit/BA unit/PPGA unit/LA unit/MMA unit) was 60/10/10/12/8. The nonionic surfactant had a surface tension of 30.5 mN/m and a mass average molecular weight (Mw) of 5,000. The nonionic surfactant was water soluble. Note that the surface tension of the nonionic surfactant was measured by the Wilhelmy method using a surface tensiometer ("CBVP-Z", product of Kyowa Interface Science Co., Ltd.) at a liquid temperature of 25° C.

<Evaluation>

[Preparation of Evaluation Apparatuses]

Evaluation apparatuses used each were an inkjet recording apparatus having the configuration of the inkjet recording apparatus 100 in FIG. 1 (a prototype evaluation apparatus produced by KYOCERA Document Solutions Inc.). However, inks contained in respective four recording heads and location of nozzles in each recording head were changed from those in FIG. 1 as appropriate. With respect to each of the evaluation apparatuses, one of the magenta inks (M-1) to (M-8), one of the yellow inks (Y-1) to (Y-7), and one of the cyan inks (C-1) to (C-8) were loaded into respective three recording heads of the four recording heads. Types and order of ejection of the inks used are shown in Table 3 below.

In Table 3 below, "BTG", "BEG", "BDG", and "iPDG" respectively represent triethylene glycol mono-n-butyl ether, ethylene glycol mono-n-butyl ether, diethylene glycol mono-n-butyl ether, and diethylene glycol isopropyl ether.

TABLE 3

| | | | Pigment dispersion | | Pigment [% by mass] | Penetrating agent | |
|---|---|---|---|---|---|---|---|
| | | Ink | Type | % by mass | | Type | % by mass |
| Example 1 | First ink | M-1 | Magenta | 40.0 | 6.0 | BTG | 4.0 |
| | Second ink | Y-1 | Yellow | 46.7 | 7.0 | BTG | 5.0 |
| | Third ink | C-1 | Cyan | 53.3 | 8.0 | BTG | 7.0 |
| Example 2 | First ink | Y-2 | Yellow | 26.7 | 4.0 | BTG | 4.0 |
| | Second ink | M-2 | Magenta | 40.0 | 6.0 | BTG | 5.0 |
| | Third ink | C-1 | Cyan | 53.3 | 8.0 | BTG | 7.0 |
| Example 3 | First ink | C-2 | Cyan | 26.7 | 4.0 | BTG | 4.0 |
| | Second ink | Y-3 | Yellow | 40.0 | 6.0 | BTG | 5.0 |
| | Third ink | M-3 | Magenta | 40.0 | 6.0 | BTG | 7.0 |
| Example 4 | First ink | C-3 | Cyan | 26.7 | 4.0 | BEG | 4.0 |
| | Second ink | Y-4 | Yellow | 40.0 | 6.0 | BEG | 5.0 |
| | Third ink | M-4 | Magenta | 40.0 | 6.0 | BEG | 7.0 |
| Example 5 | First ink | C-4 | Cyan | 26.7 | 4.0 | BDG | 4.0 |
| | Second ink | Y-5 | Yellow | 40.0 | 6.0 | BDG | 5.0 |
| | Third ink | M-5 | Magenta | 40.0 | 6.0 | BDG | 7.0 |
| Comparative Example 1 | First ink | C-5 | Cyan | 40.0 | 6.0 | BTG | 4.0 |
| | Second ink | Y-6 | Yellow | 66.7 | 10.0 | BTG | 5.0 |
| | Third ink | M-6 | Magenta | 26.7 | 4.0 | BTG | 7.0 |
| Comparative Example 2 | First ink | C-6 | Cyan | 66.7 | 10.0 | BTG | 7.0 |
| | Second ink | Y-3 | Yellow | 40.0 | 6.0 | BTG | 5.0 |
| | Third ink | M-6 | Magenta | 26.7 | 4.0 | BTG | 7.0 |
| Comparative Example 3 | First ink | M-7 | Magenta | 66.7 | 10.0 | BTG | 8.0 |
| | Second ink | Y-3 | Yellow | 40.0 | 6.0 | BTG | 5.0 |
| | Third ink | C-7 | Cyan | 26.7 | 4.0 | BTG | 3.0 |
| Comparative Example 4 | First ink | C-8 | Cyan | 26.7 | 4.0 | iPDG | 4.0 |
| | Second ink | Y-7 | Yellow | 40.0 | 6.0 | iPDG | 5.0 |
| | Third ink | M-8 | Magenta | 40.0 | 6.0 | iPDG | 7.0 |

The following describes the recording heads of each evaluation apparatus in detail. Each of the recording heads included the ejection units 30 illustrated in FIGS. 3 and 4. In each of the ejection unit 30, the pressure chamber 33 had a sectional area of 0.2 mm$^2$, a width of 200 µm, and a depth of 100 µm. The nozzle flow channel 34 had a diameter of 200 µm and a length of 800 µm. The hole 32 had a diameter of 30 µm and a length of 40 µm. The nozzle 12 had a length of 30 µm. The nozzle 12 had an opening in a circular shape with a radius of 10 µm. On a substrate of the recording head, four nozzle rows are arranged and 166 nozzles 12 were arranged in each of the four nozzle rows (664 nozzles 12 in total). In each nozzle row of the nozzles 12, the nozzles 12 were arranged at a pitch of 150 dpi. Adjacent nozzle rows of the recording head were staggered in a direction along the rows by ¼ of the pitch to attain 600 dpi as a whole.

[Image Printing]

Solid images each having a size of 10 cm by 10 cm were printed on sheets of A4-size plain paper ("PDW", product of MITSUBISHI PAPER MILLS LIMITED) using the respective evaluation apparatuses in a normal-temperature and normal-humidity environment at a temperature of 25° C. and a relative humidity of 60%. In the image printing, the yellow ink, the magenta ink, the cyan ink each in an amount of 3.6 pL (11 pL in total) were ejected from the respective recording heads to print a tertiary color image.

[Image Density Measurement]

With respect to each sheet of the paper with the solid image printed thereon, a surface of the sheet with the solid image printed thereon was rubbed with non-printed paper 10 times in a reciprocal manner while applying a load of 1 kg. Thereafter, whether or not stain was made on the surface of the sheet of paper with the solid image printed thereon through the non-printed paper rubbing. Measurement was carried out in a manner that a reflection density of a non-printed portion of the sheet of the paper where the solid image has not been printed (a region 1 cm apart from an edge of the solid image) was measured using a reflectance densitometer ("RD-19", product of X-Rite Inc.). A lower image density of the non-printed portion indicates that image offset could be more prevented. If the image density of the non-printed portion is less than 0.010, evaluation as being able to prevent image offset can be made. If the image density of the non-printed portion is 0.010 or greater, evaluation as not being able to prevent image offset can be made. Measurement results are shown in Table 4 below.

TABLE 4

| | Examples | | | | | Comparative Examples | | | |
|---|---|---|---|---|---|---|---|---|---|
| | 1 | 2 | 3 | 4 | 5 | 1 | 2 | 3 | 4 |
| Offset prevention | 0.002 | 0.005 | 0.006 | 0.002 | 0.005 | 0.011 | 0.025 | 0.030 | 0.031 |

The evaluation apparatuses of Examples 1 to 5 each included three or more recording heads. The recording heads contained different inks and ejected the different inks sequentially on a recording medium. The inks each contained a pigment and a polyhydric alcohol monobutyl ether. Of the different inks, an ink to be ejected first had the lowest pigment content ratio. Of the different inks, an ink to be ejected third and an ink to be subsequently ejected (specifically, the third ink) each have a pigment content ratio equal to or higher than that of a corresponding one of inks to be precedently ejected (specifically, the second ink). Of the different inks, an ink to be ejected second and an ink to be subsequently ejected (specifically, the second ink and the third ink) each had a polyhydric alcohol monobutyl ether content ratio higher than that of a corresponding one of inks to be precedently ejected (specifically, the first ink and the second ink). As a result, each of the evaluation apparatuses of Examples 1 to 5 could prevent offset of a formed image.

By contrast, the evaluation apparatuses of Comparative Examples 1 to 4 did not meet the above conditions. Specifically, the pigment content ratio of the third ink was lower than that of the second ink in the evaluation apparatus of Comparative Example 1. In the evaluation apparatus of Comparative Example 2, the pigment content ratio of the first ink was the highest of the first to third inks. In also the evaluation apparatus of Comparative Example 2, the second ink had a polyhydric alcohol monobutyl ether content ratio lower than that of the first ink. In the evaluation apparatus of Comparative Example 3, the pigment content ratio of the first ink was the highest of the first to third inks. In also the evaluation apparatus of Comparative Example 3, the third ink had a pigment content ratio lower than that of the second ink. In also the evaluation apparatus of Comparative Example 3, the second ink and the third ink respectively had polyhydric alcohol monobutyl ether content ratios lower than those of the first ink and the second ink. Furthermore, the first to third inks in the evaluation apparatus of Comparative Example 4 contained no polyhydric alcohol monobutyl ether. As a result, each of the evaluation apparatuses of Comparative Examples 1 to 4 could not prevent offset of a formed image.

From the above results, offset of a formed image can be thought to be prevented according to the present disclosure.

What is claimed is:

1. An inkjet recording apparatus comprising three or more recording heads, wherein
   the recording heads perform ink ejection toward a recording medium in a specific order,
   the recording heads include at least a first recording head, a second recording head, and a third recording head,
   the first recording head performs the ink ejection to the recording medium first of the recording heads,
   the recording head ejects a first ink,
   the second recording head performs the ink ejection to the recording medium second of the recording heads,
   the second recording head ejects a second ink of which composition differs from that of the first ink,
   the third recording head performs the ink ejection to the recording medium third of the recording heads,
   the recording head ejects a third ink of which composition differs from those of the first and second inks,
   the first to third inks each contain a pigment and a polyhydric alcohol monobutyl ether,
   of the first to third inks, the first ink has a lowest pigment content ratio,
   the third ink has a pigment content ratio equal to or higher than that of the second ink,
   the second ink has a polyhydric alcohol monobuthyl ether content ratio higher than that of the first ink, and
   the third ink has a polyhydric alcohol monobutyl ether content ratio higher than that of the second ink.

2. The inkjet recording apparatus according to claim 1, wherein
   a difference in the polyhydric alcohol monobutyl ether content ratio between the second ink and the first ink is at least 0.5% by mass and no greater than 1.5% by mass.

3. The inkjet recording apparatus according to claim 1, wherein
   a difference in the polyhydric alcohol monobutyl ether content ratio between the third ink and the second ink is at least 1.5% by mass and no greater than 4.0% by mass.

4. The inkjet recording apparatus according to claim 1, wherein
   a difference in the pigment content ratio between the first ink and the second ink is at least 0.5% by mass and no greater than 2.5% by mass.

5. The inkjet recording apparatus according to claim 1, wherein
   a difference in the pigment content ratio between the third ink and the second ink is no greater than 2.5% by mass.

6. The inkjet recording apparatus according to claim 1, wherein
   the polyhydric alcohol monobutyl ether is represented by general formula (I) shown below:

(I)

where, in the general formula (I), R represents an alkylene group having a carbon number of at least 2 and no greater than 4, and n represents an integer of at least 1 and no greater than 5.

7. The inkjet recording apparatus according to claim 6, wherein
the polyhydric alcohol monobutyl ether is ethylene glycol monobutyl ether, diethylene glycol monobutyl ether, or triethylene glycol monobutyl ether.

8. The inkjet recording apparatus according to claim 1, wherein
the recording heads further include a fourth recording head,
the fourth recoding head performs the ink ejection to the recording medium fourth of the recording heads,
the fourth recording head ejects a fourth ink of which composition is different from those of the first to third inks,
the fourth ink contains a pigment and a polyhydric alcohol monobuthyl ether,
of the first to fourth inks, the first ink has a lowest pigment content ratio,
the fourth ink has a pigment content ration equal to or higher than that of the third ink, and
the fourth ink has a polyhydric alcohol monobutyl ether content ratio higher than that of the third ink.

9. The inkjet recording apparatus according to claim 8, wherein
a difference in the polyhydric alcohol monobutyl ether content ratio between the fourth ink and the third ink is at least 1.5% by mass and no greater than 4.0% by mass.

10. An inkjet recording apparatus comprising three or more recording heads, wherein
the recording heads perform ink ejection to a recording medium in a specific order,
the recording heads include at least a first recording head, a second recording head, and a third recording head,
the first recording head performs the ink ejection to the recording medium first of the recording heads,
the first recording head ejects a first ink,
the second recording head performs the ink ejection to the recording medium second of the recording heads,
the second recording head ejects a second ink of which composition differs from that of the first ink,
the third recording head performs the ink ejection to the recording medium third of the recording heads,
the third recording head ejects a third ink of which composition differs from those of the first and second inks,
the first to third inks each contain a pigment and a polyhydric alcohol monobutyl ether,
the pigment contained in the first ink, the pigment contained in the second ink, and the pigment contained in the third ink are different from one another,
of the first to third inks, the first ink has a lowest pigment content ratio,
the third ink has a pigment content ratio equal to or higher than that of the second ink,
the second ink has a polyhydric alcohol monobutyl ether content ratio higher than that of the first ink, and
the third ink has a pohyhydric alcohol monobuthyl ether content ratio higher than that of the second ink.

* * * * *